United States Patent
Hasson et al.

(10) Patent No.: US 8,140,507 B2
(45) Date of Patent: Mar. 20, 2012

(54) METHOD AND SYSTEM FOR SEARCHING ACROSS INDEPENDENT APPLICATIONS

(75) Inventors: Laurent Hasson, New York, NY (US); David Konopnicki, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 229 days.

(21) Appl. No.: 11/772,268

(22) Filed: Jul. 2, 2007

(65) Prior Publication Data

US 2009/0012950 A1    Jan. 8, 2009

(51) Int. Cl.
*G06F 17/30* (2006.01)
(52) U.S. Cl. .................................. 707/706; 707/741
(58) Field of Classification Search .................. 707/706, 707/741
See application file for complete search history.

(56) References Cited

U.S. PATENT DOCUMENTS

| | | | |
|---|---|---|---|
| 6,094,657 A | 7/2000 | Hailpern et al. | |
| 6,175,863 B1 | 1/2001 | Belfiore et al. | |
| 6,785,688 B2 | 8/2004 | Abajian et al. | |
| 6,931,397 B1 | 8/2005 | Sundaresan | |
| 7,269,787 B2 | 9/2007 | Amitay et al. | |
| 2002/0099737 A1 | 7/2002 | Porter | |
| 2005/0256867 A1 | 11/2005 | Walther et al. | |
| 2005/0289133 A1 | 12/2005 | Arrouye et al. | |
| 2006/0004691 A1 | 1/2006 | Sifry | |
| 2006/0155685 A1 | 7/2006 | Grim et al. | |
| 2006/0212451 A1* | 9/2006 | Serdy et al. | 707/10 |
| 2008/0021903 A1* | 1/2008 | Singhal et al. | 707/10 |

FOREIGN PATENT DOCUMENTS

WO    WO03005240 A1    1/2003

* cited by examiner

*Primary Examiner* — Khanh Pham
*Assistant Examiner* — Johnese Johnson (57) ABSTRACT

A method and system are provided for searching across independent applications. A first seedlist (202) is provided from a first application (201), the first seedlist (202) including a list of data items (211) for crawling by a search engine (220). The data items (211) are owned by the first application (201). A second seedlist (206) is also provided from a second independent application (205), the second seedlist (206) including annotation data (214) for crawling by a search engine (220). The annotation data (214) relates to the data items (211) of the first application (201). A search index (204) provides searchable data from the two or more applications (201, 205), the searchable data relating to the same set of data items (211).

20 Claims, 8 Drawing Sheets

METHOD AND SYSTEM FOR SEARCHING ACROSS INDEPENDENT APPLICATIONS

FIELD OF THE INVENTION

This invention relates to the field of searching. In particular, the invention relates to searching across independent applications to create searchable content.

BACKGROUND OF THE INVENTION

Search engines allow an application to make its content searchable. A known approach for making data searchable is by using seedlists, also know as sitemaps. In this approach, an application provides the search engine with a list of data items that needs to be made searchable, the seedlist. Crawling happens in two phases. First, the search engine crawls the seedlist information containing metadata about the data items that need to be crawled. Then, in a second phase, the pieces of content from the application themselves are retrieved, and the data is made searchable. Note that this second phase is optional and there are cases in which only the metadata in the seedlist is retrieved and made searchable.

An application of this approach is Google Sitemap Protocol (Google is a trade mark of Google, Inc.) that allows a webmaster to inform search engines about pages on their sites that are available for crawling. In its simplest form, a sitemap is an XML (Extensible Markup Language) file that lists URLs (Uniform Resource Locators) for a site along with additional metadata about each URL (for example, when it was last updated, how often it usually changes, and how important it is relative to other URLs in the site) so that search engines can more intelligently crawl the site.

Web crawlers usually discover pages from links within the site and from other sites. Sitemaps supplement this data to allow crawlers that support sitemaps to pick up all URLs in the sitemap and learn about those URLs using the associated metadata.

Seedlists are a generalization of sitemaps since sitemaps contains only URLs and very little metadata about them while seedlists contains a lot of metadata about the data items including for example, security information. The term seedlist as used herein should be interpreted as including sitemaps.

In some types of application, content is not created in the application but instead existing content from other sources is commented upon, annotated, tagged, or classified, etc. For example, applications that aggregate content and annotations already exist in the web, such as, http://answers.shopping-.com. This application aggregates data of products and in particular prices from various web sites. However, the content of such applications is obtained through traditional web crawling and content extraction or using web services APIs (Application Programming Interfaces). Additionally, this aggregation is usually not used to improve the searchability of the items, only to add more metadata (comments, ratings, etc.) and this aggregation is done explicitly with a knowledge of the domain and the metadata expected.

Another example of an application that references and adds metadata to existing content from other sources is an application for social bookmarking, such as Dogear (a trade mark of International Business Machines Corporation) or del.i-cio.us (a trade mark of Yahoo!Inc.). Social bookmarking lets users centrally store, categorized and share a set of personal web bookmarks with others. Tags are stored in relation to content from other sources on the web or in an Intranet. Thus, bookmarks are easier to find since they can be retrieved using the tags they have been associated with.

These applications which provide metadata in the form of annotations to content from external sources are referred to as annotating applications. Currently, each such annotating application manages the searchability of its annotations independently from the searchability of the external content itself.

Enterprise search engines aim to make all the content or data available in an enterprise searchable. The problem arises as to how to manage content and annotations applied in an independent application in the context of an enterprise search engine.

SUMMARY OF THE INVENTION

It is an aim of the present invention that all available metadata relating to a content should be used when making content searchable.

According to a first aspect of the present invention there is provided a method for searching, comprising: providing a first seedlist from a first application, the first seedlist including a list of data items for crawling by a search engine, wherein the data items are owned by the first application; providing a second seedlist from a second independent application, the second seedlist including annotation data for crawling by a search engine, wherein the annotation data relates to the data items of the first application.

According to a second aspect of the present invention there is provided a system for searching, comprising: a first seedlist crawler for crawling a seedlist from a first application, the first seedlist including a list of data items for crawling, wherein the data items are owned by the first application; a second seedlist crawler for crawling a seedlist from a second independent application, the second seedlist including annotation data for crawling, wherein the annotation data relates to the data items of the first application.

According to a third aspect of the present invention there is provided a computer program product stored on a computer readable storage medium for searching across independent applications, comprising computer readable program code means for performing the steps of: providing a first seedlist from a first application, the first seedlist including a list of data items for crawling by a search engine, wherein the data items are owned by the first application; providing a second seedlist from a second independent application, the second seedlist including annotation data for crawling by a search engine, wherein the annotation data relates to the data items of the first application.

In this case, both applications (the creating application and the annotating application) provide a seedlist. Data and annotations can be consolidated in one search index or in different search indexes.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 1:
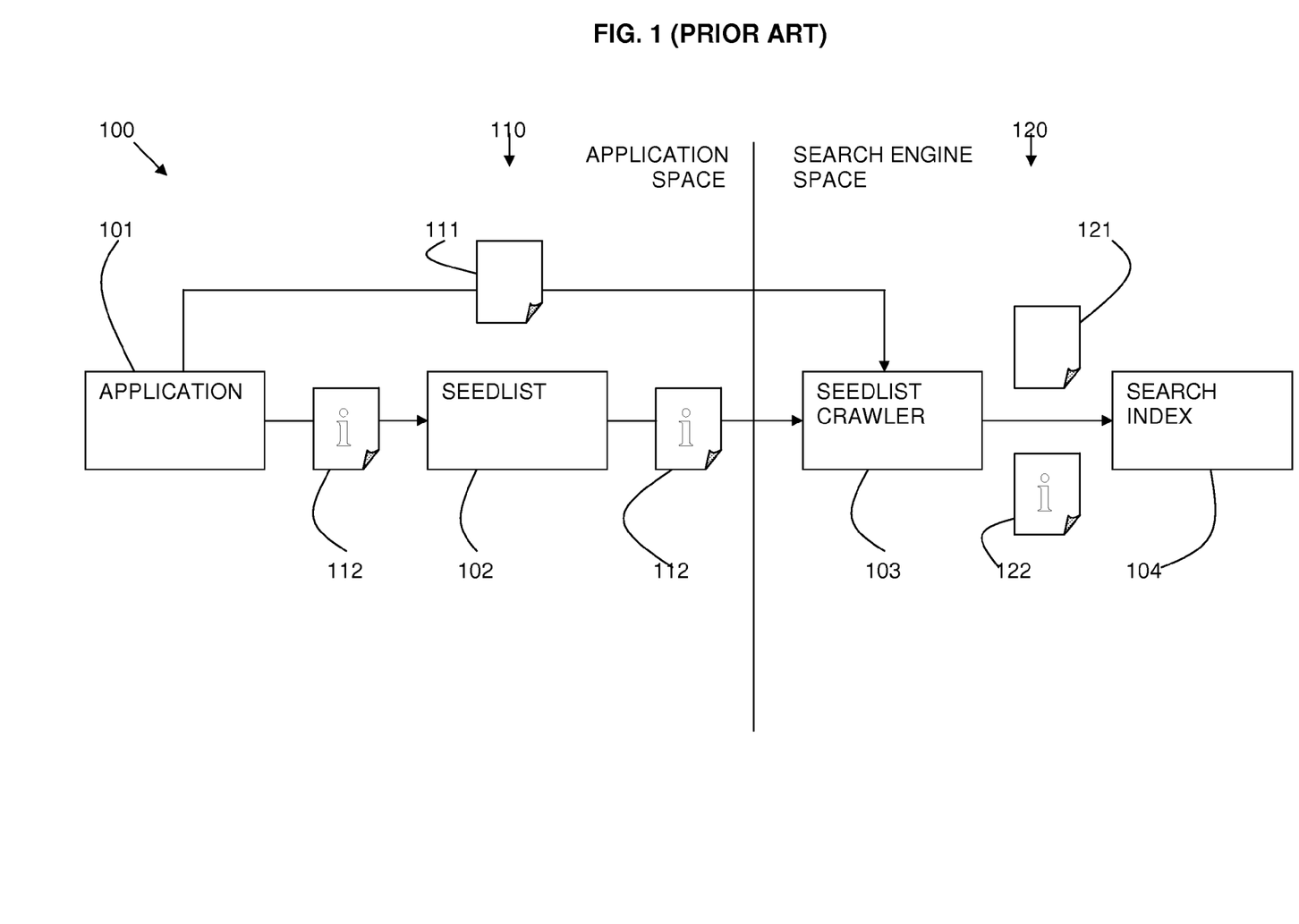
FIG. 1 is a schematic flow diagram of a method of making content searchable as known in the prior art.

Referring to FIG. 1, a schematic flow diagram 100 shows a process known in the art of indexing the content 111 of an application 101. The application 101 is the content owner. For example, the application 101 may be a content repository which provides storage, searching and retrieval of hierarchical data.

FIG. 1 is divided into the application space 110 and the search engine space 120. The application 101 provides a seedlist 102 to provide information 112 relating to the content 111.

The seedlist 102 provides information 112 in the form of a list of data items describing the contents of application 101 that need to be made searchable and that are available for crawling by a seedlist crawler 103. For example, the seedlist 102 may provide a list of URLs on a web site that are available for crawling. The seedlist 102 can include additional information about each data item, such as when it was last updated, how often it changes, its importance, etc. The seedlist 102 enables the search engine 120 to crawl the content more intelligently.

The seedlist crawler 103 of the search engine 120 then crawls the content 111 using the seedlist information 112. In some cases, the content itself is found in the seedlist 102 and crawling the content 111 is not required. In some applications, the content itself is not available at indexing time.

The seedlist crawler 103 provides a searchable form 121 of the content 111 to a search index 104. The seedlist crawler 103 also provides a searchable form 122 of the associated information 112 to a search index 104.

Figure 2:
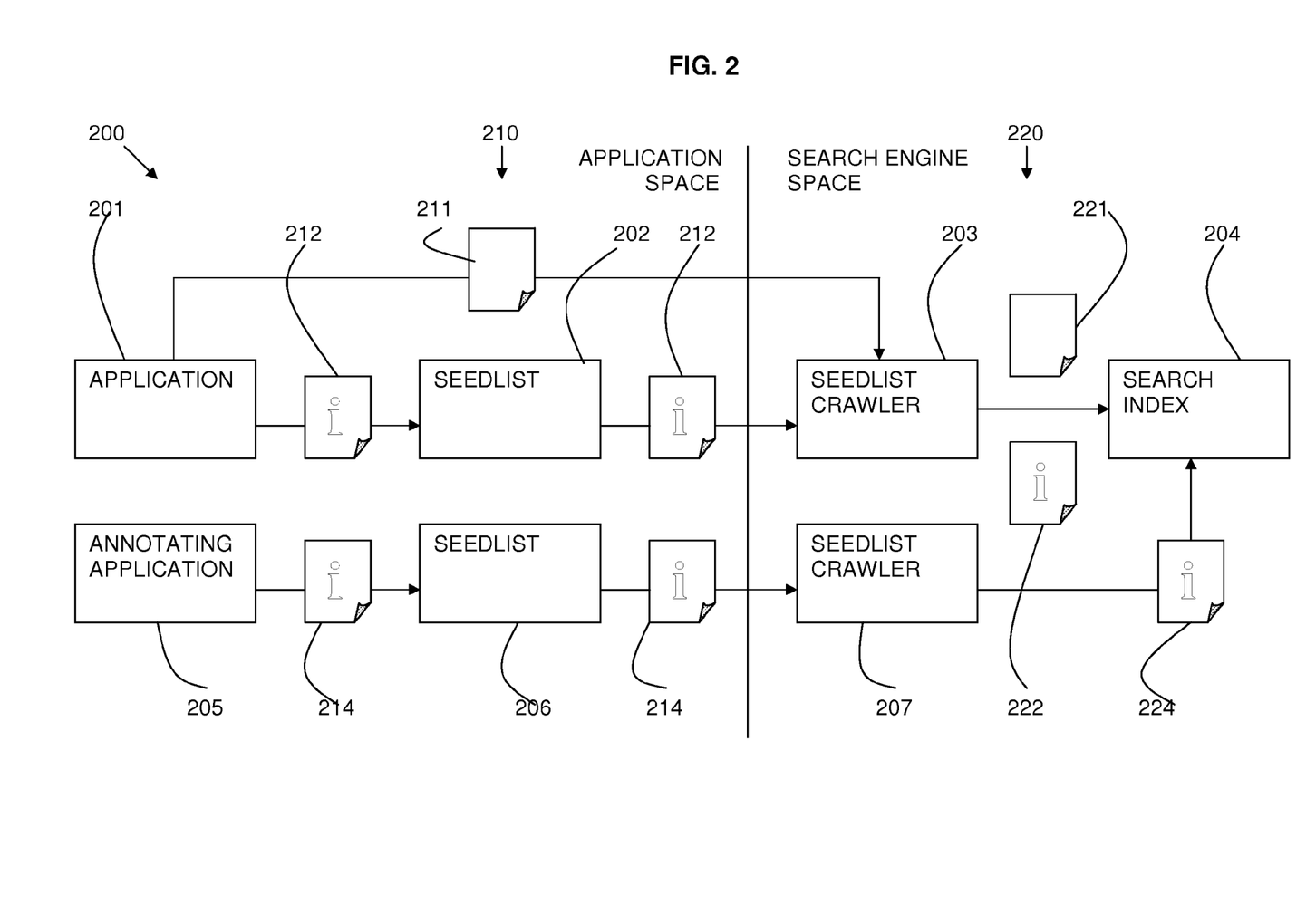
FIG. 2 is a schematic flow diagram of a method of making content searchable in accordance with the present invention.

Referring to FIG. 2, a similar schematic flow diagram 200 to that of FIG. 1 is shown for a method and system in accordance with an embodiment of the invention. As in FIG. 1, the diagram is divided into application space 210 and search engine space 220.

An application 201 owns the content 211 which is to be made searchable. The application 201 provides a first seedlist 202, to provide information 212 relating to the content 211.

The first seedlist 202 provides information 212 in the form of a list of data items in the content of application 201 that need to be made searchable and that are available for crawling by a first seedlist crawler 203. The first seedlist 202 can include additional information about each data item, such as, when it was last updated, how often it changes, its importance, etc.

The first seedlist crawler 203 of the search engine 220 then crawls the content 211 using the seedlist information 212. In some cases, the content itself is found in the first seedlist 202 and crawling the content 211 is not required.

The first seedlist crawler 203 provides a searchable form 221 of the content 211, together with a searchable form 222 of the associated information 212, to a search index 204. Up to this point, processing is as described in FIG. 1.

Additionally, as shown in FIG. 2, an annotating application 205 provides annotations on the content 211 of the application 201. The term annotating application is used for any system providing metadata or annotations relating to content, where the content is from another source.

The annotating application 205 provides a second seedlist 206 which is a metadata seedlist providing information 214 relating to the annotations of the annotating application 205. With respect to the output of the annotating application 205, the terms metadata and annotation are used interchangeably to signify that this data refers to the content managed by application 201, namely the content 211. More than one annotating application (such as annotating application 205) can refer to the same external content (in the described example, content 211).

A second seedlist crawler 207 of the search engine 220 then crawls the annotations of the annotating application 205 retrieving the seedlist information 214 from inside the seedlist 206. The second seedlist crawler 207 provides a searchable form 224 of the information 214 of the annotations to the search index 204. Thus, the annotations of the annotating application 223 are made searchable in the search engine 220 together with the data initiating from application 201 that is the searchable content 221 together with its metadata 222.

It is possible to index all data related to a given content from the first and second seedlists 202, 206 in the same index 204. The second seedlist crawler 207 for an annotating application may be modified to enable annotations to be merged into the search index 204 for a given content. Alternatively as described further with reference to FIG. 4, the second seedlist crawler 207 may index the data relating to the content and the annotations provided by the annotating applications 205 in different search indexes.

Figure 3:
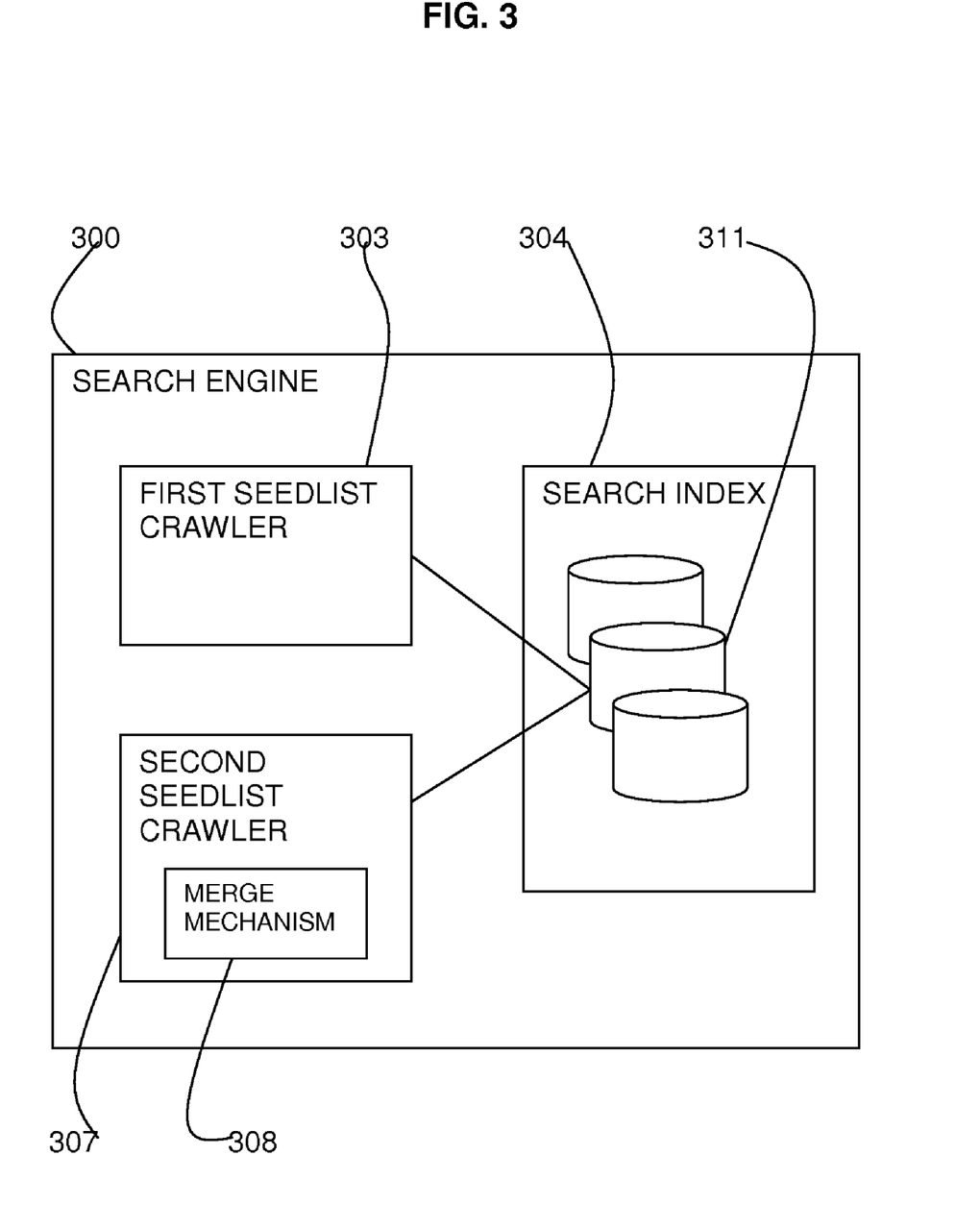
FIG. 3 is block diagram of a first embodiment of a search engine in accordance with the present invention.

Referring to FIG. 3, a first embodiment of a search engine 300 is shown. The search engine 300 includes a search index 304, a first seedlist crawler 303 for crawling a seedlist from a content owning application, and a second seedlist crawler 307 for crawling a metadata seedlist from an annotating application.

A merging mechanism 308 is provided for merging the annotation data into the search index 304 for a given content. It needs to be determined which collection 311 of a search index 304 contains a given content. One way of achieving this is to ask each collection if they contain Document X, X being the ID of the document for which annotation data has been retrieved from the annotating application. It is assumed that a piece of content has a universal document ID, for example, a URL and URN (Uniform Resource Name).

The merging mechanism 308 may be provided as part of the second seedlist crawler 307 as shown in FIG. 3, or as part of the search index 304.

The following example describes the embodiment described in FIG. 2 and FIG. 3. The following seedlist defined by the owner of a web site is provided:

```

<url> http://www.example.com/index.html</url>
    <updated>daily </updated>

```

This seedlist describes the web page whose URL is http://www.example.com/index.html and specifies as metadata that the content of this page is updated daily.

Now, the following annotation seedlist provided by a recommendation site, is provided:

```

<url> http://www.example.com/index.html</url>
    <annotation>very good vegetable shop</annotation>

```

The annotation seedlist specifies that http://www.example.com/index.html is the URL of a very good vegetables shop.

The first seedlist crawler 303 crawls the first seedlist and indexes its data (daily), then the seedlist crawler 303 uses the URL found in the seedlist to crawl the site itself (http://www.example.com/index.html). The second seedlist crawler 307 crawls the second seedlist. Using the merge mechanism 308, the second seedlist crawler 307 checks whether some information has been stored in the index 304 in relation to the specified web site http://www.example.com/index.html.

The second seedlist crawler 307 then updates the metadata related to this web site with the additional information "very good vegetable shop". As a result of this operation, when users of the search engine 300, search for "very good vegetable shop", the URL of http://www.example.com/index.html is more likely to be returned as a search result.

The search engine 300 gives a unified view of a content, such as a document, and its metadata, including annotation data. To be efficient, this merging requires the ability to update metadata without re-fetching the content It is also possible for the content to be virtually aggregated through the seedlist of an annotating application. That is, indexing a metadata seedlist without the content seedlist. The metadata seedlist from an annotating application would describe in the seedlist that the content must be fetched. Effectively, this tells the crawler to retrieve the content data through the URL supplied, thus achieving a powerful content and metadata aggregation infrastructure.

Figure 4:
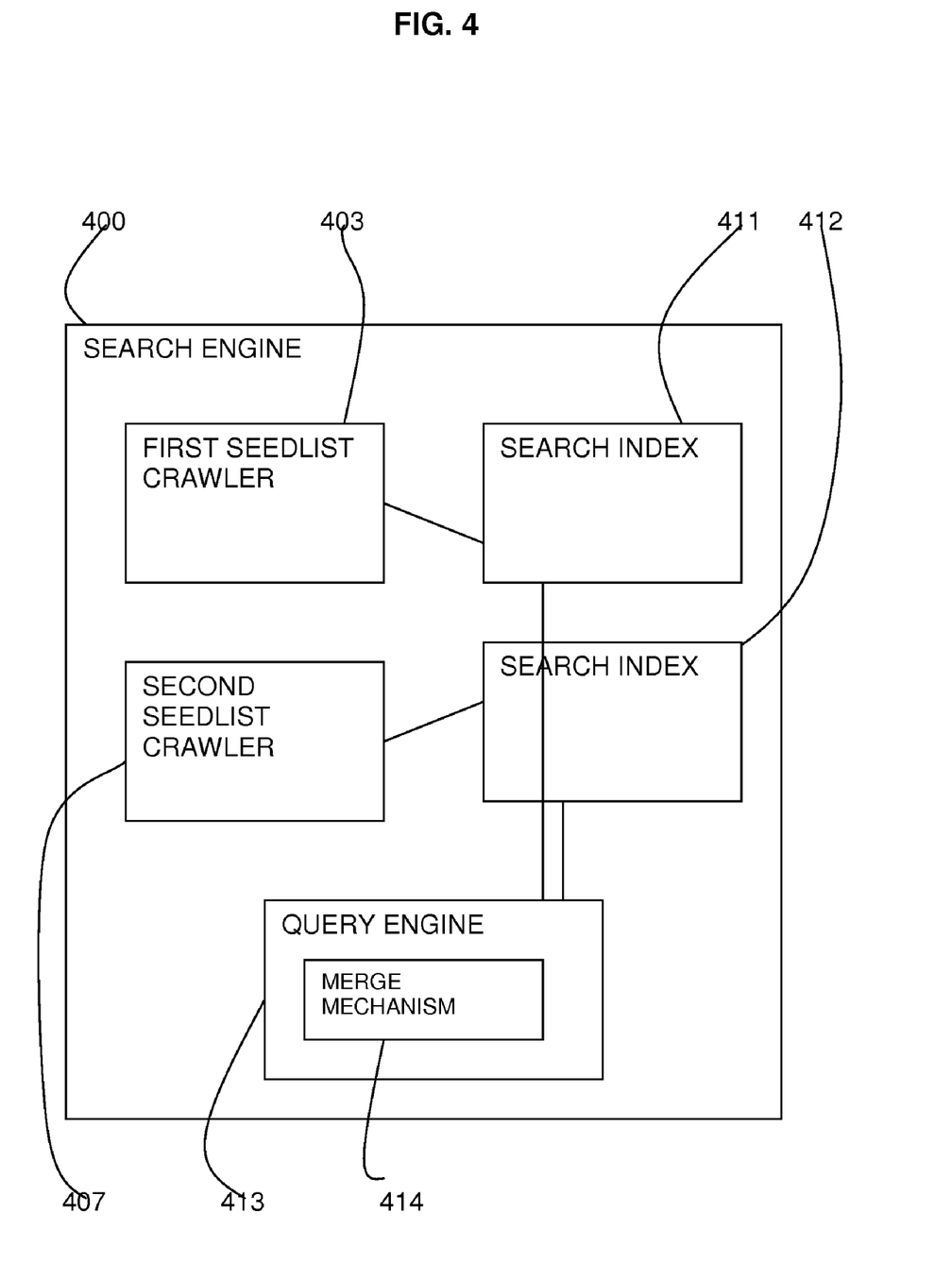
FIG. 4 is a block diagram of a second embodiment of a search engine in accordance with the present invention.

Referring to FIG. 4, a second embodiment of a search engine 400 is provided in which the annotation data from an annotating application is stored in a different search index to that of the content and metadata from the content owning application. The content and metadata from the content owning application are indexed in index 411, while the annotation data from the annotating application is indexed in a different index 412. In this embodiment, unification between the indexes is done at query time.

The search engine 400 includes search indexes 411, 412, a first seedlist crawler 403 for crawling a seedlist from a content owning application, and a second seedlist crawler 407 for crawling an metadata seedlist from an annotating application.

The search engine 400 includes a first search index 411 containing the content itself and any metadata obtained by the first seedlist crawler 403, and a second search index 412 containing the annotation data relating to the content as obtained by the second seedlist crawler 407.

The search engine 400 has a query engine 413 including a merging mechanism 414.

In the second embodiment, the information about the same content could be spread over multiple search indexes. Therefore, at query time, there is a need to do some merging. For a given content hit, the other collections would need to be queried as to whether they have additional information about that content, and then a merge carried out.

Following, the example given above, the content of page http://www.example.com/index.html and the annotation data related to this page (it being a very good vegetables shop) would be stored in two different indexes.

Given a query "good vegetable shop", http://www.example.com/index.html would be returned from the second index and information would need to be extracted from the first index to get all the information about http://www.example.com/index.html. Querying data in the second embodiment is less powerful than in the first embodiment since content and annotations are queried separately in each index. For example, if the application content document contains the word CAT while the corresponding annotation associated by the annotating application is DOG, in the first embodiment, CAT and DOG are stored together and associated with the document. So the query "CAT DOG" is very likely to return the document. In the second embodiment, CAT is associated with the document in one index, while DOG is associated with the document in a second index. Thus, the query "CAT DOG" run on each index separately may not return the document.

Figure 5:
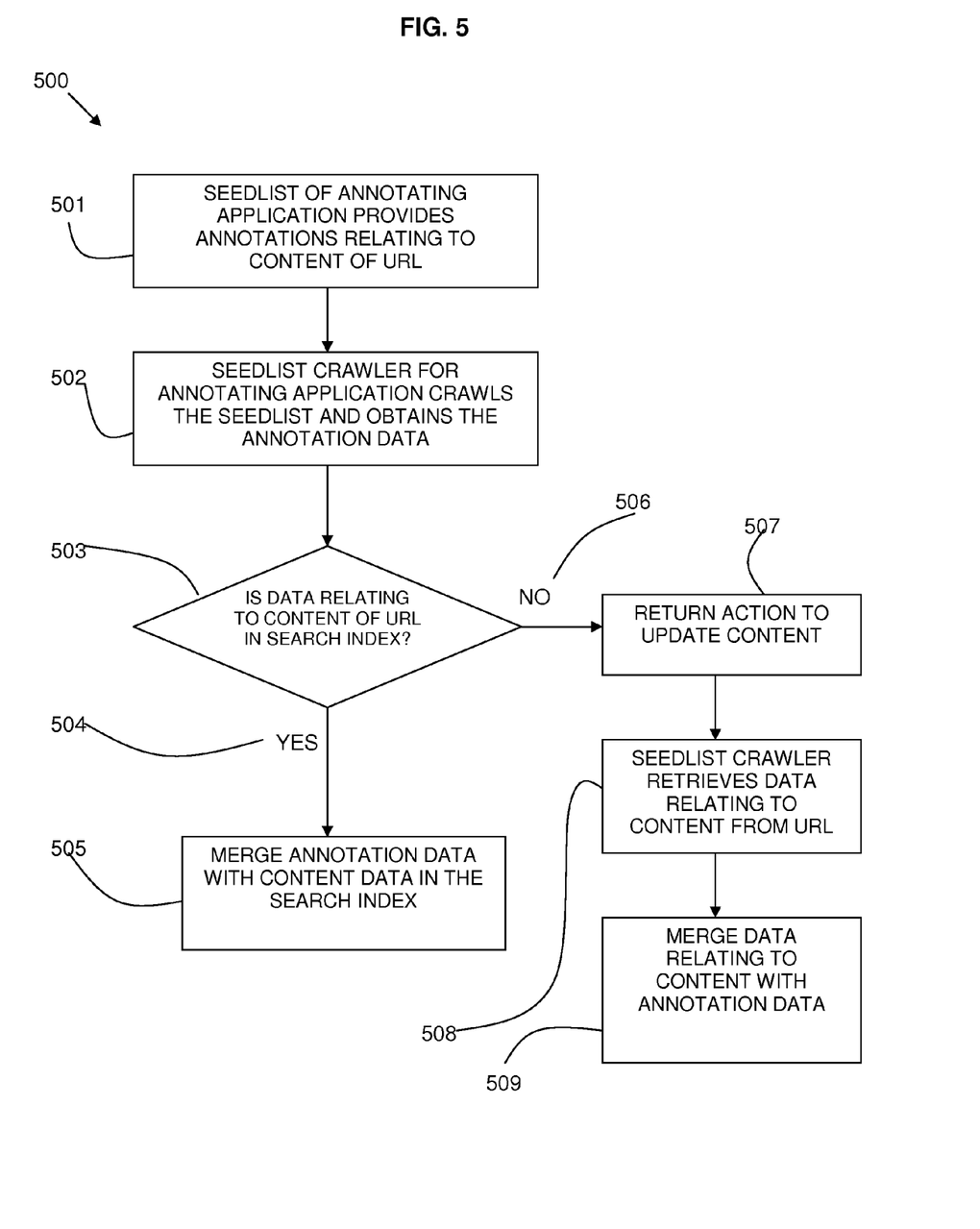
FIG. 5 is a flow diagram of a method of operation of the first embodiment of FIG. 3.

FIG. 5 is a flow diagram 500 of a method of operation of the first embodiment shown in FIG. 3 in which data relating to the content and the annotation data are provided in the same search index collection. A seedlist for an annotating application provides annotation data 501 for content such as a document identified by a URL. The seedlist crawler crawls 502 the seedlist to obtain the annotation data for indexing.

It is determined 503 if the content of the URL is in the search index collection. If the content is in the collection 504, the annotation data is merged 505 with the content data in the search index.

If the content of the URL is not in the search index collection 506, the seedlist crawler returns 507 an action to update the content. The seedlist crawler retrieves 508 the content data from the URL and merges 509 this with the annotation data and stores in the search index.

Figure 6A:
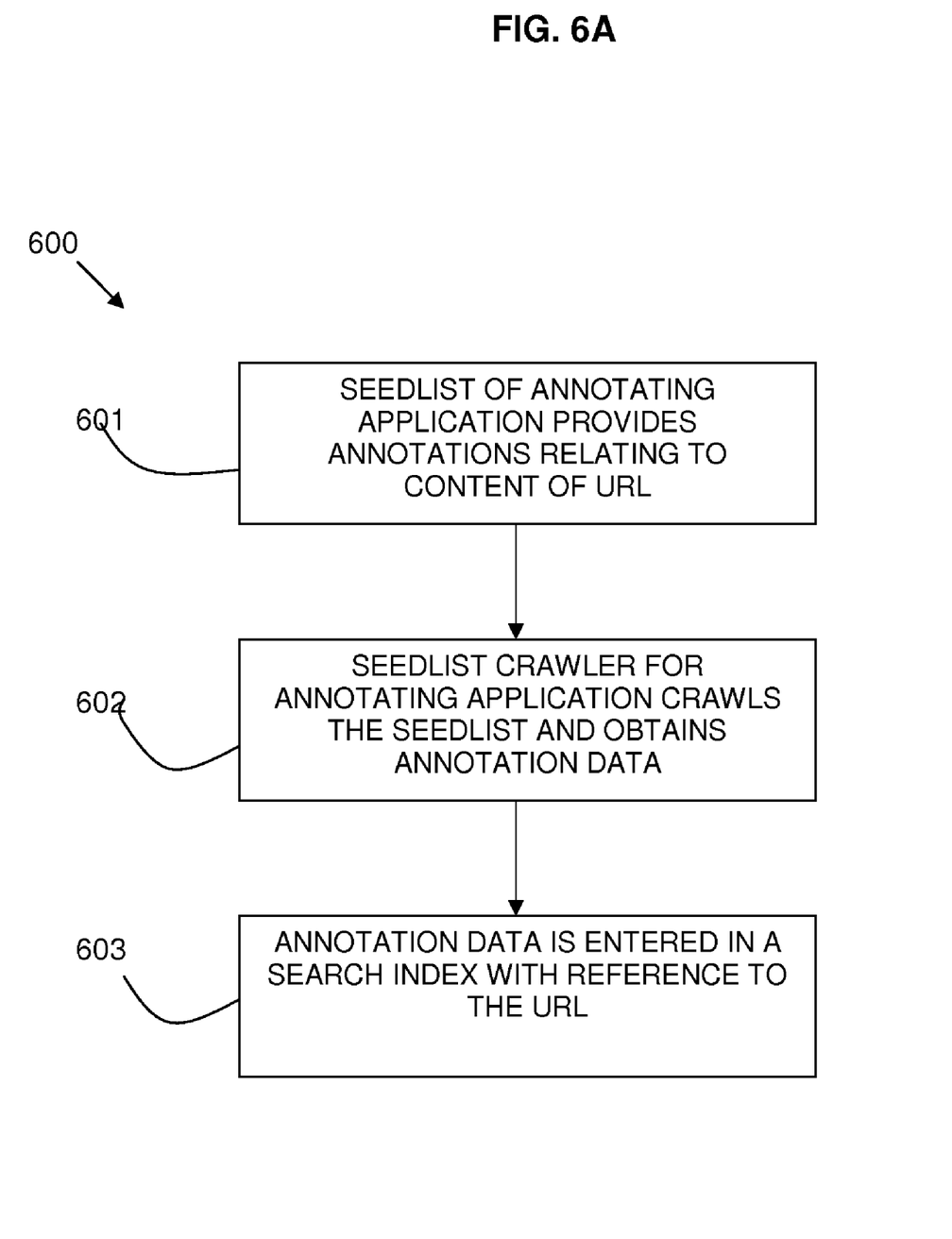
FIGS. 6A and 6B are flow diagrams of methods of operation of the second embodiment of FIG. 4.
Figure 6B:
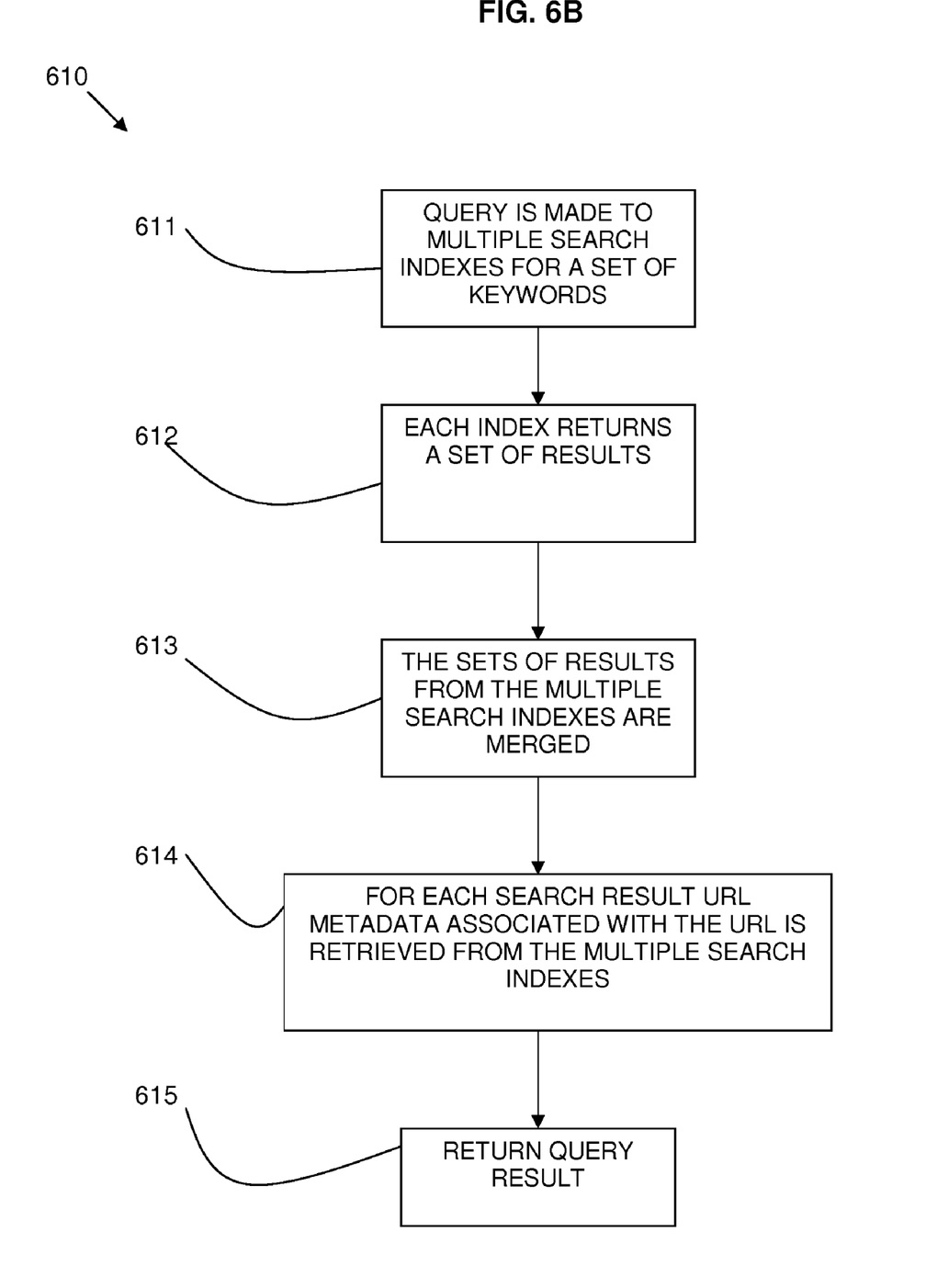

FIGS. 6A and 6B are flows diagram 600, 610 of methods of operation of the second embodiment shown in FIG. 4 in which data relating to the content and the annotation data are indexed in different search indexes.

In FIG. 6A, a seedlist of an annotating application provides 601 annotations relating to content identified by a URL. A seedlist crawler for the annotating application crawls the seedlist and obtains 602 the annotation data. The annotation data is entered 603 in a search index with a reference to the URL.

In FIG. 6B, a query 611 is made to multiple search indexes for a set of keywords to be searched. Each index returns 612 a set of results and the sets of results from the indexes are merged 613. The sets of results returned from the indexes may include results located via the annotation data. For example, using the example given above, if the search keywords were "very good vegetable shop", the URL of http://www.example.com/index.html may be returned as a result due to the annotation data provided in the search index.

For each search result URL all metadata related to the URL is retrieved 614 from all the search indexes that contain annotation data, metadata or content data relating to the URL. The query result is then returned 615.

Different seedlists created by different services can be used to annotate the same content. This allows different views of the content to be considered in the searchable index.

The described approach is completely passive, automated and standardized. The described method and system allow applications to register themselves, and add annotation data they want to contribute. There is no need to know in advance anything about the format of the pages containing the annotation data or specific APIs to use.

Applications are used to publish seedlists/sitemaps to be crawlable and publish their updates. By allowing sitemaps to contain annotation data and item IDs, and merging sitemaps' annotation data into the search index the described approach enables the searchable data to be enriched with additional annotation data coming from various systems and enhances its searchability Referring to FIG. 7, an exemplary system for implementing the invention includes a data processing system 700 suitable for storing and/or executing program code including at least one processor 701 coupled directly or indirectly to memory elements through a bus system 703. The memory elements can include local memory employed during actual execution of the program code, bulk storage, and cache memories which provide temporary storage of at least some program code in order to reduce the number of times code must be retrieved from bulk storage during execution.

Figure 7:
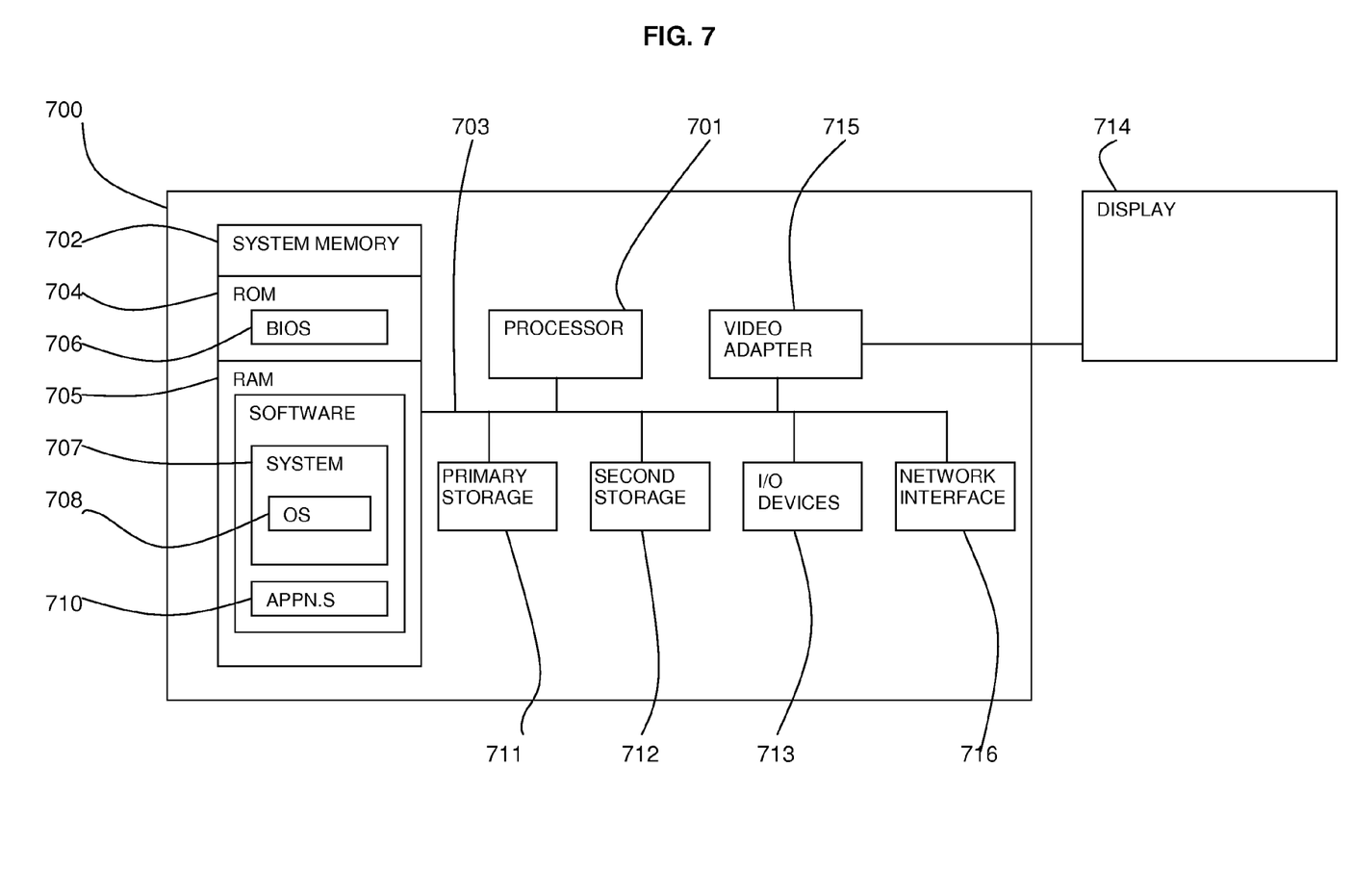
FIG. 7 is a block diagram of a computer system in which the present invention may be implemented.

The memory elements may include system memory 702 in the form of read only memory (ROM) 704 and random access memory (RAM) 705. A basic input/output system (BIOS) 706 may be stored in ROM 704. System software 707 may be stored in RAM 705 including operating system software 708. Software applications 710 may also be stored in RAM 705.

The system 700 may also include a primary storage means 711 such as a magnetic hard disk drive and secondary storage means 712 such as a magnetic disc drive and an optical disc drive. The drives and their associated computer-readable media provide non-volatile storage of computer-executable instructions, data structures, program modules and other data for the system 700. Software applications may be stored on the primary and secondary storage means 711, 712 as well as the system memory 702.

The computing system 700 may operate in a networked environment using logical connections to one or more remote computers via a network adapter 716.

Input/output devices 713 can be coupled to the system either directly or through intervening I/O controllers. A user may enter commands and information into the system 700 through input devices such as a keyboard, pointing device, or other input devices (for example, microphone, joy stick, game pad, satellite dish, scanner, or the like). Output devices may include speakers, printers, etc. A display device 714 is also connected to system bus 703 via an interface, such as video adapter 715.

A search system as described for searching collaboration across independent applications may be provided as a service to a customer over a network.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

We claim:

1. A computer-implemented method, comprising:
communicating between first and second applications and a computerized search engine that is separate from and independent of the first and second applications;
receiving from the first application a first seedlist, which specifies first data items for crawling by the computerized search engine, the first data items relating to content that is owned by the first application;
receiving from the second application, which is separate from and independent of the first application, a second seedlist specifying second data items for crawling by the computerized search engine, wherein the second data items annotate at least part of the content and are produced by the second application by processing the content irrespective of the first application and independently of the computerized search engine;
crawling the first and second seedlists using the computerized search engine so as to retrieve first and second data from the first and second applications, respectively;
identifying a relation between the first and second applications, indicating that the second data items annotate the at least part of the content; and
responsively to identifying the relation, jointly indexing the first and second data using the computerized search engine in at least one search index.

2. A method as claimed in claim 1, wherein receiving and crawling the second seedlist comprises receiving and crawling multiple second seedlists from multiple second applications that annotate the content, so as to provide searchable data relating to the first data.

3. A method as claimed in claim 1, wherein the first seedlist includes metadata relating to the first data items.

4. A method as claimed in claim 1, including:
obtaining data relating to the first data items of the first seedlist and adding the first data to the at least one search index; and
obtaining data relating to the second data items of the second seedlist and adding the data to the at least one search index.

5. A method as claimed in claim 4, including merging the second data items of the second seedlist with the data relating to the first data items of the first seedlist in a single search index.

6. A method as claimed in claim 4, including indexing the second data items of the second seedlist in a different search index to the data relating to the first data items of the first seedlist.

7. A method as claimed in claim 6, including submitting a query relating to a data item, and merging the second data items of the second seedlist and the data relating to the first data items of the first seedlist in a response to the query.

8. A method as claimed in claim 1, wherein the second seedlist from the second application includes annotation data relating to data items which are not in the at least one search index, and the method includes retrieving data relating to the data items and adding the data to the at least one search index.

9. A method as claimed in claim 1, wherein the second data items of the second seedlist comments upon, annotates, tags, rates or classifies the first data items.

10. A method as claimed in claim 1, wherein the data items are referred to by a universal identifier and all data, metadata, or annotation data relating to the data items is merged using the universal identifier.

11. A system, comprising:
a first seedlist crawler, which is configured to receive from a first application that is separate from and independent of the system a first seedlist, which specifies first data items relating to content that is owned by the first application, and to retrieve first data from the first application by crawling the first seedlist;
a second seedlist crawler, which is configured to receive from a second application, which is separate from and independent of both the system and the first application, a second seedlist specifying second data items that annotate at least part of the content and are produced by the second application by processing the content irrespective of the first application and independently of the system, and to retrieve second data from the second application by crawling the second seedlist; and
a processor, which is configured to identify a relation between the first and second applications indicating that the second data items annotate the at least part of the content, and, responsively to identifying the relation, to jointly index the first and second data in at least one search index.

12. A system as claimed in claim 11, wherein the second seedlist crawler is configured to receive and crawling multiple second seedlists from multiple second applications that annotate the content, so as to provide searchable data relating to the first data items.

13. A system as claimed in claim 11, wherein,
the first seedlist crawler is configured to obtain data relating to the first data items of the first seedlist and to add the data to the at least one search index; and
the second seedlist crawler is configured to obtain data relating to the second data items of the second seedlist and to add the data relating to second data items to the at least one search index.

14. A system as claimed in claim 13, wherein the processor is configured to merge the second data items of the second seedlist with the data relating to the first data items of the first seedlist in a single search index.

15. A system as claimed in claim 13, wherein the processor is configured to index the second data items of the second seedlist in a different search index to the data relating to the first data items of the first seedlist.

16. A system as claimed in claim 15, wherein the processor is configured to submit a query relating to a data item, and to merge the second data items of the second seedlist and the data relating to the first data items of the first seedlist in a response to the query.

17. A system as claimed in claim 11, wherein the second seedlist crawler is configured to obtain data relating to data items for which the second seedlist includes annotation data, but which data items are not in the at least one search index.

18. A method as claimed in claim 11, wherein the second data items of the second seedlist comments upon, annotates, tags, rates or classifies the first data items.

19. A method as claimed in claim 11, wherein the data items are referred to by a universal identifier and all data, metadata, or annotation data relating to the data items is merged using the universal identifier.

20. A computer software product for use in a search system, the product comprising a non-transitory computer-readable medium, in which program instructions are stored, which instructions, when read by a computer in the search system, cause the computer to receive from a first application that is separate from and independent of the search system a first seedlist, which specifies first data items relating to content that is owned by the first application, to retrieve first data from the first application by crawling the first seedlist, to receive from a second application, which is separate from and independent of both the search system and the first application, a second seedlist specifying second data items that annotate at least part of the content and are produced by the second application by processing the content irrespective of the first application and independently of the search system, to retrieve second data from the second application by crawling the second seedlist, to identify a relation between the first and second applications indicating that the second data items annotate the at least part of the content, and, responsively to identifying the relation, to jointly index the first and second data in at least one search index.

* * * * *